United States Patent [19]

Becker et al.

[11] Patent Number: 4,505,003
[45] Date of Patent: Mar. 19, 1985

[54] APPARATUS FOR THE PRODUCTION OF FILLED TUBULAR CASINGS

[75] Inventors: Reinhold Becker; Wolfgang Michel, both of Wiesbaden, Fed. Rep. of Germany

[73] Assignee: Hoechst Aktiengesellschaft, Frankfurt am Main, Fed. Rep. of Germany

[21] Appl. No.: 486,422

[22] Filed: Apr. 19, 1983

[30] Foreign Application Priority Data

Apr. 21, 1982 [DE] Fed. Rep. of Germany ....... 3214673

[51] Int. Cl.³ .............................................. A22C 11/02
[52] U.S. Cl. .......................................... 17/41; 53/576; 141/311 R
[58] Field of Search .................. 17/41, 42; 53/576; 141/311 R, 313, 316, 114, 10

[56] References Cited

U.S. PATENT DOCUMENTS

| | | | |
|---|---|---|---|
| 2,871,508 | 2/1959 | Hill | 17/41 |
| 4,007,761 | 2/1977 | Beckman | 138/103 |
| 4,077,090 | 3/1978 | Frey et al. | 17/41 |
| 4,202,075 | 5/1980 | Michel et al. | 17/41 |
| 4,321,728 | 3/1982 | Marz | 17/41 |

Primary Examiner—Willie G. Abercrombie
Attorney, Agent, or Firm—Schwartz, Jeffery, Schwaab, Mack, Blumenthal & Koch

[57] ABSTRACT

An apparatus for stuffing a shirred tubular casing with a fluid material such as a sausage composition or pieces of ham comprising a stuffing horn having an aperture through which the fluid material is forced under pressure into the casing, a device located on the periphery of the stuffing horn and within the interior of the casing for smoothing and expanding the casing, the device comprising at least two disk-shaped planar bodies, at least one of which is rotatable in a plane parallel to and/or shiftable perpendicular to the longitudinal axis of the stuffing horn, the outer circumference of each planar body being smaller than the inner circumference of the tubular casing, whereby the projection of the cross-sectional surfaces of the planar bodies in the direction of the longitudinal axis upon rotating or shifting of the bodies results in a total surface having a greater circumference than the inner circumference of the tubular casing.

16 Claims, 11 Drawing Figures

APPARATUS FOR THE PRODUCTION OF FILLED TUBULAR CASINGS

This invention relates to an apparatus for the production of filled tubular casings, and in particular tubular casings such as are filled with a sausage composition or pieces of ham.

BACKGROUND OF THE INVENTION

It is known to use shirred tubular casings of synthetic, semi-synthetic or natural materials for packing food products, for example meat products in the form of sausage compositions or pieces of ham. These shirred casings, which are known in the trade as "sticks" or "hollow rods", are produced by gathering and longitudinally compressing long casings to a length which usually is only 1 to 3 percent of their original length. In order to fill a shirred casing with a sausage composition, in general, one end of the casing is first closed and then the casing is fit onto the stuffing horn of a sausage filling machine. The sausage composition is then forced under pressure through the stuffing horn into the casing which is thereby continuously unshirred. After a predetermined length of the sausage casing has been filled, cylindrical sausages are tied off and closed.

For various reasons, the diameter of the sausages should remain constant over their entire length. Optimum stuffing can be assured only by a uniform diameter of the casing, the size of which is, e.g., dependent upon the material used for the particular casing. If the casing is overstuffed, it may burst, whereas, if the casing is insufficiently filled, it will have a wrinkled surface.

Various devices for stuffing shirred tubular casings with sausage compositions have been proposed, which comprise special unshirring, smoothing and braking devices for achieving the most uniform diameter possible for the stuffed casings.

Thus, it is conventional to dispose, adjacent the outlet of the stuffing horn, a calibrating means, the outward surface of which presses against the inside wall of the casing to be filled and expands the casing. This contact pressure between the calibrating means and the inside wall of the casing gives rise to frictional forces which brake the motion of the casing (U.S. Pat. No. 2,871,508).

It is also known to package the shirred tubular casing together with a calibrating disk and to connect this assembly to the stuffing horn of a sausage machine prior to the filling operation (U.S. Pat. No. 4,007,761). The calibrating disk is surrounded by an unshirred portion of the casing, whereby the outer circumference of the calibrating disk should be larger than the internal circumference of the unshirred casing. During the filling operation, the casing is drawn over the calibrating disk and is thereby stretched and expanded (U.S. Pat. No. 4,077,090). The calibrating disk must be made of a rigid, inelastic material so that its diameter will not be altered by the contact pressure of the casing against the periphery of the calibrating disk. Braking of the casing as it is withdrawn from the shirred portion during the filling operation is effected by means of an additional device having the form of a ring with an annular attachment disposed following the calibrating disk whereby the braking effect is controlled by the frictional forces produced between the tubular casing and the attachment.

These inelastic calibrating disks have the disadvantage that the variations in casing circumference which cannot be avoided during the manufacturing process, will not allow optimum filling of the casing. Moreover, if the diameter of the casing is too small, there is danger that the casing may be damaged or torn by the calibrating disk. At the very least, an extraordinarily strong frictional force will arise between the calibrating disk and the casing, so that the casing will be overstuffed with sausage composition and have a tendency to be unable to withstand the high pressures which arise during boiling of the sausage, and burst. In addition, the degree of expansion of the sausage casing cannot be varied during the stuffing process, because it is predetermined by the calibrating disk used in each particular case.

Further, a calibrating device is known (U.S. Pat. No. 4,202,075) which is made of a flexible material and has a variable diameter. This device is also intended to stretch and expand the tubular casing prior to filling the casing with sausage composition and is designed for a controllable expansion, which, however, can be realized to a very limited degree only, depending upon the stretchability of the casing. Even with this device, however, strong frictional forces can occur between the tubular casing and the calibrating means. With this device, too, the braking of the tubular casing is effected using a braking element which is disposed ater the calibrating means and presses the tubular casing against the stuffing horn.

OBJECTS OF THE INVENTION

Accordingly, it is the object of the present invention to provide an apparatus for simultaneously unshirring, smoothing, expanding and, if appropriate, braking a shirred tubular casing before filling it by means of a stuffing device, the apparatus of the invention permitting a problemless conversion of the tubular casing from the shirred into an unshirred state, whereby no defects and wrinkles occur and braking takes place simultaneously, and whereby the danger of the tubular casing being damaged by the braking means or the calibrating means is avoided.

Further, a smooth, jerk-free withdrawal of the casing is made possible by the apparatus of the invention, in order that the danger of tearing the casing is reduced. An additional object of the present invention is to provide the possibility of varying the degree to which the casing is expanded within a wide range.

DESCRIPTION OF THE INVENTION

For simplicity of discussion, the following description will use the term "smoothing device" which is intended to mean "a device for unshirring, smoothing, expanding and, if appropriate, braking".

The apparatus of this invention includes such a smoothing device during the stuffing of a shirred tubular casing with a fluid material such as a sausage composition or pieces of ham, the apparatus comprising a stuffing horn having an aperture through which the fluid material is forced under pressure, a shirred tubular casing disposed on the peripheral surface of the stuffing horn, the casing having an unshirred portion of a predetermined inner circumference into which the fluid material is pressed, whereby the shirred casing is continuously unshirred and removed from the stuffing horn. A device for smoothing and expanding the tubular casing is located on the peripheral surface of the stuffing horn near the stuffing horn aperture and in the interior of the tubular casing, and includes a bore by means of which it is pushed onto and fastened to the stuffing horn.

The smoothing device comprises two or more disk-shaped planar bodies which are arranged on the stuffing tube, whereby at least one of the planar bodies is detachably fixed to the stuffing horn and may be rotated and/or shifted, in a plane parallel and/or perpendicular to the longitudinal axis of the stuffing horn. In this manner, the projection of the cross-sectional surfaces of the planar bodies in the direction of the longitudinal axis of the stuffing horn, which can be achieved by rotating or shifting the planar bodies relative to one another, results in a total surface which has a greater circumference than the inner circumference of the unshirred tubular casing.

The inside circumference of the unshirred tubular casing is expanded, when the casing is slid over the smoothing device, whereby the degree of expansion can be varied in accordance with the position of the two disk-shaped planar bodies, which can be mutually offset by rotation and/or by shifting them along the longitudinal axis of the stuffing horn. The braking action is particularly strong when two neighboring planar bodies are moved in opposite directions in a plane extending perpendicularly to the longitudinal axis of the stuffing horn. This can, for example, be effected by designing the bores provided in the planar bodies as slotted holes, the widths of which approximately correspond to the diameter of the stuffing horn, whereas their lengths are greater than the diameter of the stuffing horn. It is also possible to use elliptical planar bodies which preferably have central bores, whereby a maximum expansion of the tubular casing is achieved when two neighboring planar bodies are rotated through an angle of 90° with respect to each other. If the planar bodies have a circular cross-section, they possess eccentric bores, so that they describe an eccentric path when being rotated about these bores. In the case of planar bodies provided with eccentric bores, maximum expansion is achieved when two neighboring planar bodies are rotated through an angle of 180° with respect to each other.

Mutual offsetting and/or rotation of the planar bodies may be effected manually before or after fitting the tubular casing onto the stuffing horn or by means of one or several gripping elements by which the periphery of the respective planar body is seized and rotated or shifted, either before or after fitting the tubular casing onto the stuffing horn. Only a section of the periphery of the planar body is seized by the gripping element, whereby a direct contact is created between these sections and the unshirred tubular casing. The gripping element may additionally act as a brake, which presses the unshirred tubular casing against the periphery of the planar body, whereby the movement of the tubular casing during the stuffing process is slowed down.

In another embodiment, the planar bodies are shifted and/or rotated by means of a cylindrical tube surrounding the stuffing horn. The first end of this tube is located at that end of the stuffing horn which is opposite the stuffing horn aperture, i.e., which is fastened to the stuffing device. One of the planar bodies is mounted on the other end of the tube, whereas the second planar body is fastened to the peripheral surface of the stuffing horn, at a distance from the first planar body, in the direction of the stuffing horn aperture. In this embodiment, the position of the planar body fastened to the tube relative to the second planar body can be varied by rotating or shifting the tube, which is also possible during the stuffing process. The force required for shifting or rotating acts upon the first end of the tube, i.e. the end protruding from the interior of the shirred casing. The other end of the tube, which extends into the shirred casing, ends before reaching the planar body which is fastened to the stuffing horn.

In an alternative embodiment, the second end of the tube is adjacent the stuffing horn aperture, and one planar body is mounted on the tube. The first end of the tube ends before another planar body which is mounted on the stuffing horn. In this embodiment, it is not possible, however, to vary the positions of the planar bodies during the stuffing process.

In still another embodiment, two planar bodies are mounted on a cylindrical tube, which surrounds the peripheral surface of the stuffing horn, and the length of which preferably is relatively short, as compared with the length of the stuffing horn. One or the two planar bodies are rotatably arranged on the tube. In a preferred embodiment one of the planar bodies and the tube form one single piece, whereas the second planar body is rotatably mounted on the tube. Particularly preferably, the rotatable planar body is arranged closely to the neighboring planar body; by means of holding elements, it is fastened, in a detachable manner, to the adjacent cross-sectional surface of the neighboring planar body, so that it is fixed in its position, these holding elements being, for example, a spring catch engaging recesses or bores provided in said cross-sectional surface.

There are provided detachable joints, which may, for example, be threads, slide catches or spring catches, between the tube surrounding the stuffing horn and the stuffing horn, and the planar bodies and the stuffing horn, or the planar bodies and the tube, or between the two planar bodies.

A particularly high degree of expansion is achieved when two neighboring planar bodies, being rotated through an angle relative to one another, are moved towards each other, parallel to the longitudinal axis of the stuffing horn. The more the distance between the two planar bodies is reduced, the greater is the expansion, so that by controlling the distance between the planar bodies, in particular during stuffing, the braking effect onto the tubular casing as it is withdrawn from the stuffing horn and thus the diameter of the stuffed casing can be controlled.

Seen in the direction of the longitudinal axis of the stuffing horn, the disk-shaped planar bodies in general have a circular or oval, i.e. elliptical, cross-section. Cross-sections having the shape of polygons, e.g. triangles, quadrangles or hexagons with rounded edges are also possible, however. The bores provided in the planar bodies either correspond to the cross-section of the stuffing horn or are slotted holes.

The outer circumference of the planar bodies is smaller than the inner circumference of the unshirred tubular casing, so that the unshirred casing can be drawn over the planar bodies without having to overcome substantial frictional forces, if only the distance between two neighboring planar bodies is chosen wide enough or the two planar bodies are aligned congruently, seen in the direction of the longitudinal axis of the stuffing horn. When the planar bodies are projected in the direction of the longitudinal axis of the stuffing horn, a total surface is obtained, which at least corresponds to the cross-sectional surface of the largest planar body and thus is smaller than the cross-section of the unshirred tubular casing. For the stuffing process, the planar bodies are mutually offset by rotating them through different angles about the stuffing horn. The projection of the planar bodies in the direction of the longitudinal axis of the stuffing horn then results in a total surface which is greater than the cross-sectional surface of the unshirred tubular casing.

The tubular casing is made, for example, from a material which is customarily used for sausage casings, such as cellulose hydrate, collagen or synthetic intestines which are made, for example, of polyamide or polyester. If appropriate, the casing may be fiber-reinforced, particularly with a paper insert. The casing may also have the usual coatings on its outer and/or inner surface, for example, of a material impermeable to water vapor and oxygen, which may be anchored to the surface of the tubular casing by means of customary adhesion-promoting agents. When a cellulose hydrate casing is used, it may have the usual water content of from about 6 to 15 percent, but it may also have a very high water content of, for example, about 25 percent and higher, so that it is not necessary to soak the casing in water prior to stuffing. In general, cellulose hydrate casings are produced by coagulating viscose and regenerating the cellulose and contain plasticizers, such as glycerol.

The essential elements of the apparatus of the invention are the smoothing device disposed near the stuffing horn aperture, either on the stuffing horn itself or on a tube surrounding the stuffing horn; if appropriate, gripping elements which can be pressed against the smoothing device and act on the peripheral surface of the unshirred portion of the tubular casing, and by which the smoothing device is seized; and further, if appropriate, braking means, by which the tubular casing is constricted or compressed in the direction of the stuffing horn between two neighboring planar bodies, in particular perpendicularly to the longitudinal axis of the stuffing horn. The stuffing device is used for filling tubular casings with, for example, sausage compositions.

The smoothing device is preferably made of a relatively rigid material; in general, it is composed of metal or plastic. During the stuffing process, it is kept at a fixed position, but if desired, it may also be rotated or shifted during the stuffing process. Usually, the smoothing device comprises two individual planar bodies. However, the shape and number of the planar bodies can be chosen arbitrarily. If the device is equipped with gripping elements, the surfaces of these elements contacting the peripheral surface of the casing are preferably made of a smooth, elastic material, for example, rubber, so that the tubular casing is not damaged when being compressed.

A preferred embodiment of the apparatus provides that, after passing over the smoothing device, the tubular casing is constricted by a ring disposed immediately at the stuffing horn aperture, in order to ensure that the sausage composition forced through the aperture into the casing cannot flow back in the direction of the smoothing device. The apparatus then comprises devices which are known per se, such as devices for closing or tying the tubular casing, for example, a clipping device and a cutting station where the stuffed and closed portions of the casing are cut off.

For stuffing, the shirred tubular casing is pushed onto the stuffing horn, the front portion of the shirred casing is unshirred, drawn over the smoothing device, and closed by the clipping device. In order to facilitate the application of the shirred casing onto the stuffing horn, it is possible to use planar bodies which are comprised of a number of individual segments and may be swung down flatly onto the stuffing horn. It is also possible to push the planar bodies onto the stuffing horn after pushing on the shirred casing or simultaneously with the shirred casing, in the form of prepacked planar bodies; after the stuffing process, the planar bodies may be cleaned and re-used. Such prepacks comprising a shirred casing and the respective planar bodies may, for example, be produced in accordance with U.S. Pat. No. 4,007,761.

By the pressure forcing the pasty stuffing material, e.g. a sausage composition, into the unshirred portion of the tubular casing, the casing is continuously drawn over the peripheral surfaces of the planar bodies, whereby it is simultaneously unshirred, smoothed and expanded. When the frictional forces generated by the contact between the inner surface of the tubular casing and the peripheral surface of the planar bodies are sufficiently high, the movement of the tubular casing is slowed down. This braking action can be controlled by the degree to which the tubular casing is expanded; by the contact pressure existing between the planar bodies and the gripping elements; and/or by the brake which, between two neighboring planar bodies, acts on the tubular casing. As a rule, the speed at which the tubular casing is unshirred is from 10 m/min to 20 m/min.

When the casing is stuffed completely, the planar bodies serving as smoothing elements are either laid down flatly onto the stuffing horn or removed, depending on the type of planar body used. Then the next shirred tubular casing can be pushed onto the stuffing horn.

BRIEF DESCRIPTION OF THE DRAWINGS

Identical items are designated by the same reference numerals throughout the drawings.

DETAILED DESCRIPTION OF PREFERRED EMBODIMENTS

Figure 1B:
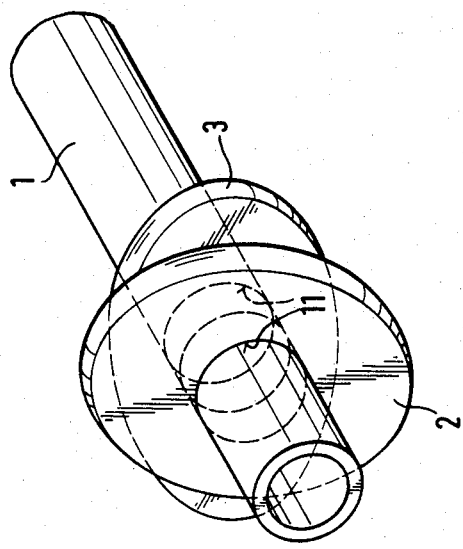
FIGS. 1a and 1b are perspective views of elliptical planar bodies.
Figure 1A:
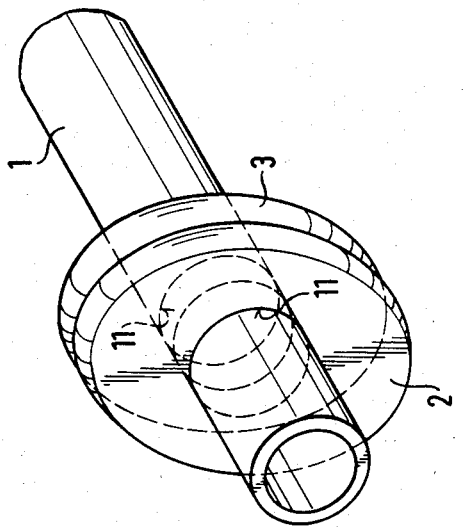
Figure 2A:
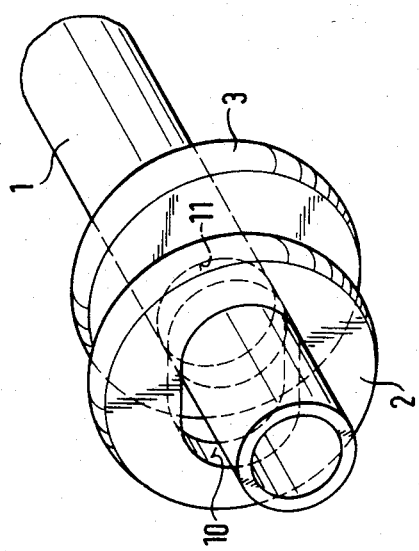
FIGS. 2a and 2b are perspective views of circular planar bodies having slotted holes.

In FIG. 1a, the elliptical planar bodies 2 and 3 pushed onto the stuffing horn 1, are arranged in congruent and directly adjacent manner. When the planar bodies are in this position, the unshirred portion of the tubular casing can be drawn over them without being expanded. In FIG. 1b, the two planar bodies 2 and 3 have been rotated through an angle of 90° relative to one another, so that the maximum expanding effect is reached. In FIG. 2a, the planar body 2 is provided with a slotted hole 10, whereas the planar body 3 has a circular bore 11, by which it is firmly held on the stuffing horn 1.

Figure 2B:
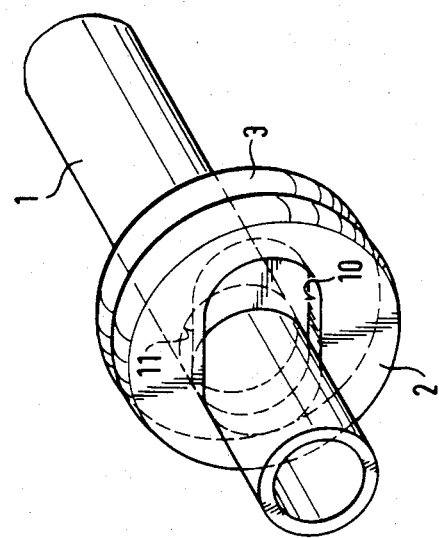
Figure 3B:
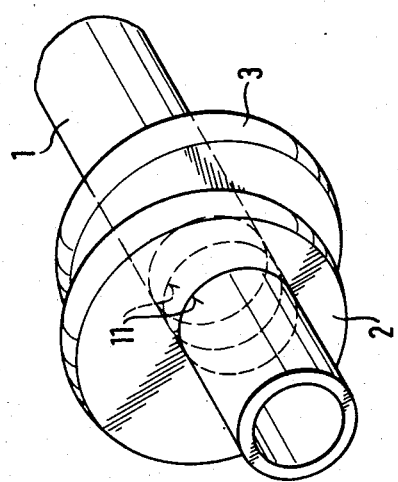
FIGS. 3a and 3b are perspective views of circular planar bodies having eccentric bores.
Figure 3A:
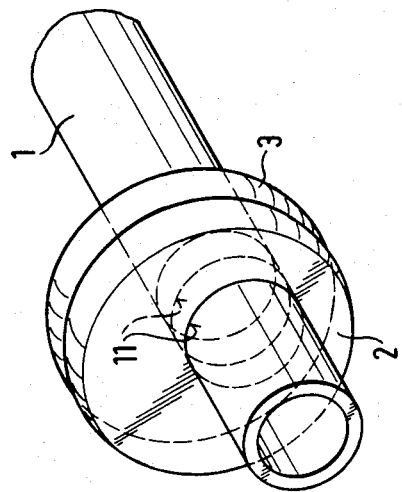

By shifting the planar body 2 perpendicularly to the longitudinal axis of the stuffing horn 1, the two planar bodies, shown in congruent alignment in FIG. 2a, are mutually offset, as shown in FIG. 2b. The same principle is employed in FIGS. 3a and 3b, where the circular planar body 2, which is mounted eccentrically, is rotated through an angle relative to the second planar body 3. For reasons of clarity, the elements for fixing the planar bodies 2 and 3 on the stuffing horn 1 have been omitted in FIGS. 1a through 3b.

Figure 4:
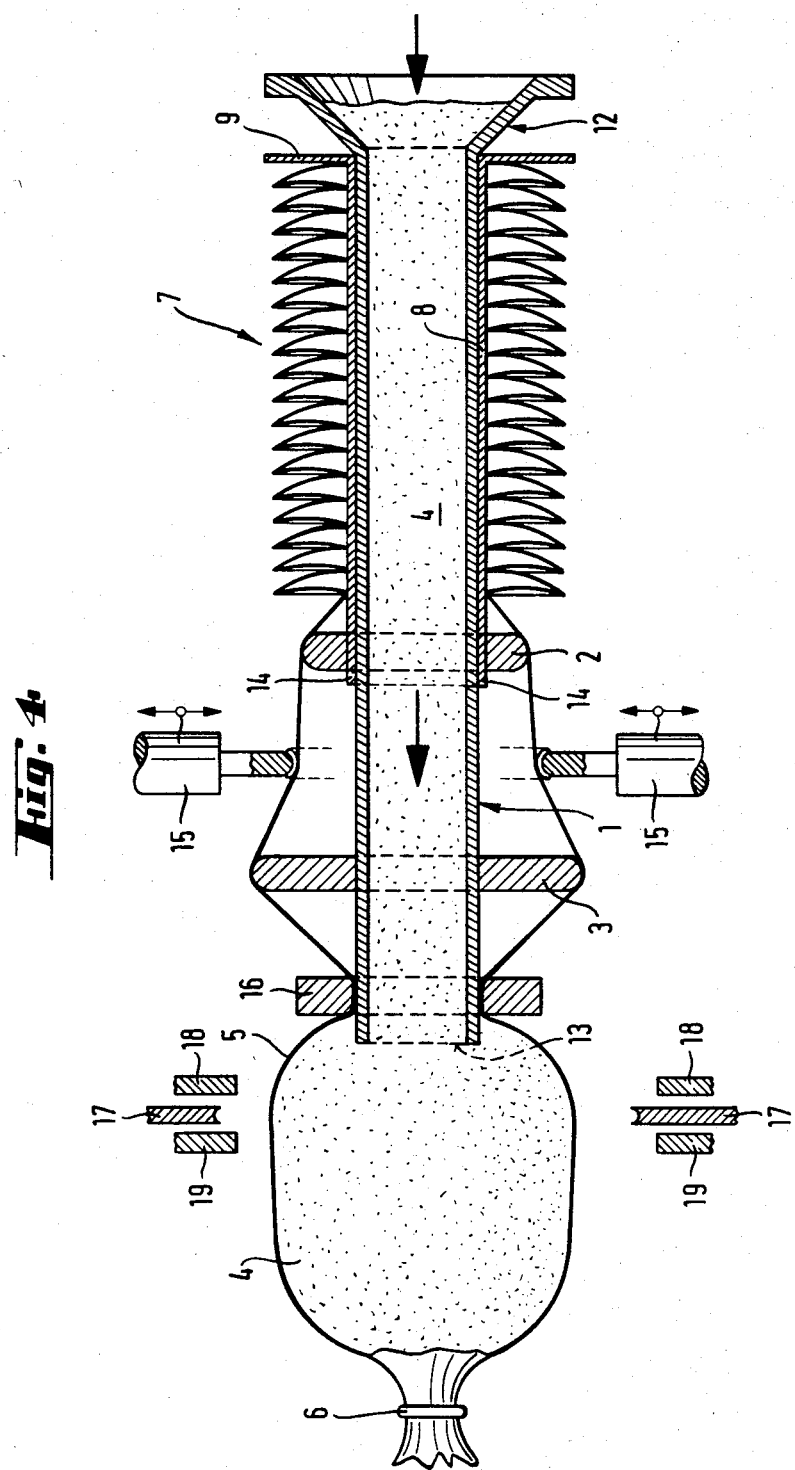
FIG. 4 is a longitudinal cross-sectional view of the device of this invention.

In FIG. 4, the sausage composition 4 is forced through the stuffing horn 1 into the unshirred tubular casing 5 which is closed by a clip. A tube 8 carries the shirred portion 7 of the tubular casing; the tube 8 surrounds the stuffing horn 1, in a way such that it can be rotated about and moved along the stuffing horn 1. The first end 9 of the tube 8 is at the end 12 of the stuffing horn opposite the stuffing horn aperture 13. The second end 14 of the tube 8 carries a planar body 2. During the stuffing process, the tubular casing is drawn over the planar bodies 2 and 3; it is constricted by the brake 15, in the direction of the stuffing horn surface. A ring element 16 prevents the sausage composition 4 from flowing back onto the peripheral surface of the stuffing horn 1. The reference numeral 17 denotes a cutting station, and 18 and 19 denote clipping stations.

Figure 5A:
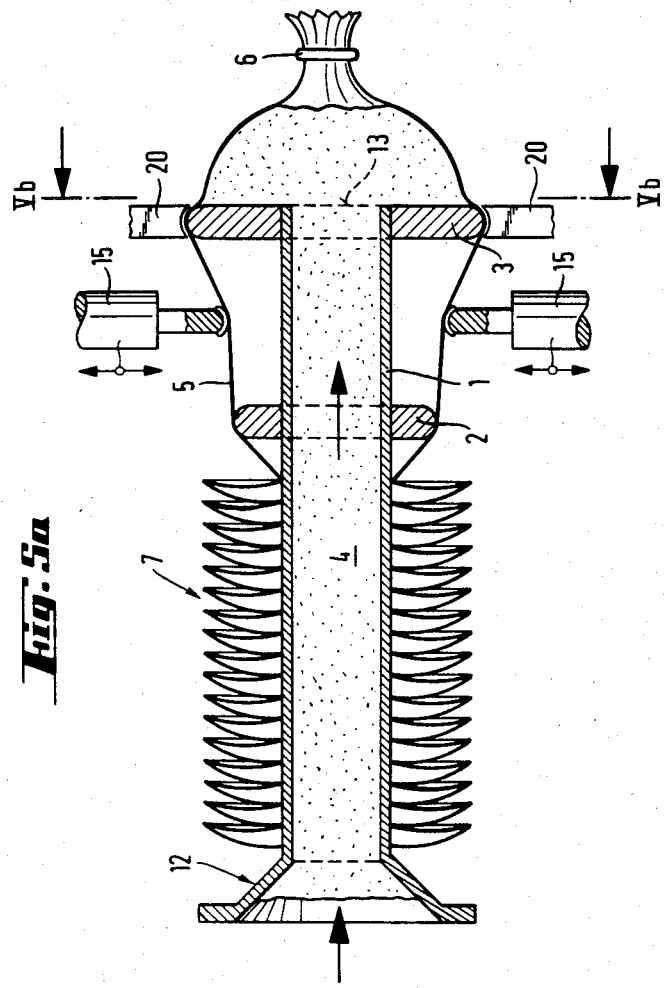
FIG. 5a is a longitudinal cross-sectional view of another embodiment of the device of this invention.
Figure 5B:
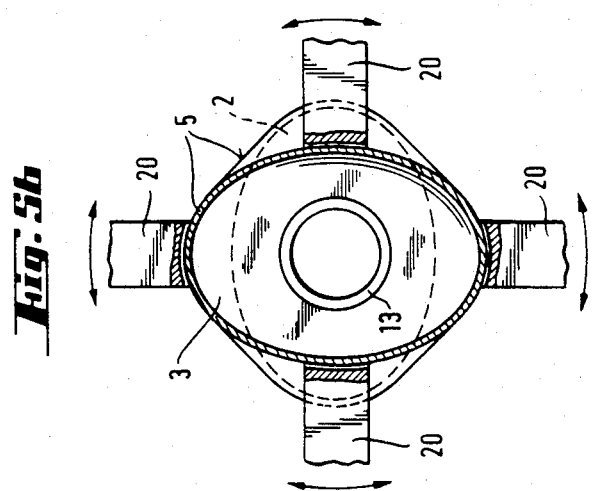
FIG. 5b is a view along line Vb—Vb of FIG. 5a and viewed in the direction of the arrows.

The embodiment of the device as shown in FIGS. 5a and 5b includes gripping elements 20 for shifting or rotating the planar body 3.

Figure 6B:
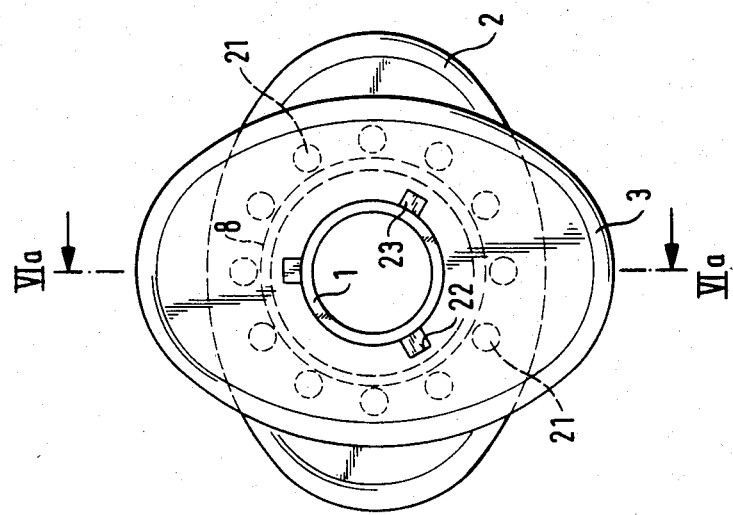
FIG. 6b is an end view of the embodiment of FIG. 6a and viewed in the direction of the arrow VIb.
Figure 6A:
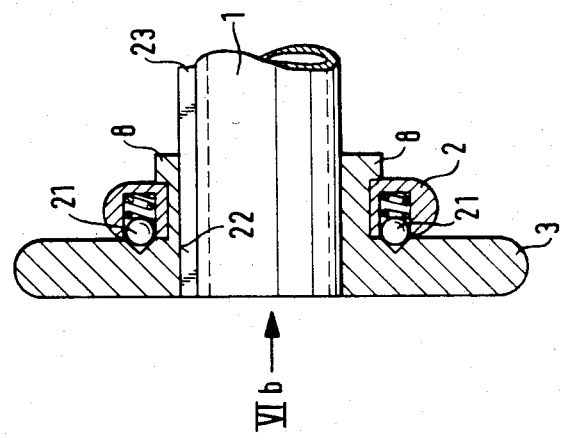
FIG. 6a is a longitudinal cross section of still another embodiment of a planar body of the invention.

Still another embodiment of the planar bodies is shown in FIGS. 6a and 6b. The two planar bodies 2 and 3 are disposed on the tube 8 which is mounted on the stuffing horn 1. The tube 8 and the planar body 3 form one single piece, whereas the planar body 2 is rotatably arranged on the tube 8 and is provided with snap elements 21 engaging the cross-sectional surface of the neighboring planar body 3. Recesses 22 provided in the tube 8 engage corresponding elevations 23 of the stuffing horn 1, when the tube 8 is pushed onto the stuffing horn 1.

What is claimed is:

1. An apparatus for stuffing a shirred tubular casing with a fluid material such as a sausage composition or pieces of ham, said apparatus comprising a stuffing horn (1) having an aperture through which the fluid material (4) is forced under pressure; a shirred tubular casing (7) disposed on the peripheral surface of the stuffing horn (1) and having an unshirred portion (5) of predetermined inner circumference, a device located on the peripheral surface of said stuffing horn (1) and in the interior of said casing (5) for smoothing and expanding the tubular casing, said device having a bore (10, 11) by means of which it is pushed onto and fastened to said stuffing horn, said device comprising at least two disk-shaped planar bodies (2, 3) on the stuffing horn (1), at least one of said planar bodies (2, 3) being rotatable in a plane parallel and/or shiftable perpendicular to the longitudinal axis of said stuffing horn, the outer circumference of each of said planar bodies (2, 3) being smaller than the inner circumference of the unshirred tubular casing (5), whereby the projection of the cross-sectional surfaces of the planar bodies (2, 3) in the direction of the longitudinal axis of the stuffing horn upon rotation or shifting of said bodies (2, 3) relative to one another results in a total surface having a greater circumference than the inner circumference of the unshirred tubular casing (1).

2. An apparatus as in claim 1 and wherein at least one of said planar bodies (2, 3) has an oval cross-section.

3. An apparatus as in claim 1 and wherein at least one of said planar bodies (2, 3) has a circular cross-section.

4. An apparatus as in claim 1 and wherein at least one of said planar bodies (2, 3) has a polygonal cross-section and rounded corners.

5. An apparatus as in claim 1 and wherein at least one of said planar bodies is eccentrically mounted about the longitudinal axis of said stuffing horn and includes an eccentric bore (10, 11).

6. An apparatus as in claim 1 and wherein said device includes at least one gripping element (20) for rotating or shifting the peripheral surface of at least one of said planar bodies and for slowing the movement of said casing during stuffing.

7. An apparatus as in claim 1 and including a cylindrical tube (8) surrounding said stuffing horn (1) and rotatable and/or axially shiftable with respect to said stuffing horn, one of said planar bodies being secured to said tube (8) and rotatable and shiftable therewith.

8. An apparatus as in claim 7 and wherein one end of said tube (8) is positioned at the end of said stuffing horn (1) opposite said aperture and the other end of said tube (8) ends before another planar body which is positioned directly on the stuffing horn (1).

9. An apparatus as in claim 7 and wherein one end (14) of said tube (8) is positioned at the end of said stuffing horn (1) adjacent said aperture (13) and the other end (9) of said tube (8) ends before another planar body (2) which is positioned directly on the stuffing horn (1).

10. An apparatus as in claim 7 and wherein two planar bodies (2, 3) are located on the tube (8), whereby one of these planar bodies (3) is firmly connected with the tube (8), and in particular forms one single piece together with said tube, and another planar body is rotatably mounted on said tube.

11. An apparatus as in claim 10 and wherein said other planar body is detachably connected to said one planar body.

12. An apparatus as in claim 1 and including at least one brake (15) positioned between two adjacent planar bodies for constricting the unshirred tubular casing in the direction of the longitudinal axis of the stuffing horn.

13. An apparatus as in claim 1 and wherein the outer circumference of each planar body is up to 20% less than the inner circumference of the unshirred tubular casing.

14. An apparatus as in claim 1 and wherein the maximum total surface obtainable by a projection of said planar bodies has a circumference up to 20% greater than the inner circumference of the unshirred tubular casing.

15. An apparatus as in claim 1 and including a ring element (16) positioned around said stuffing horn adjacent the aperture thereof for constricting an unshirred portion of the tubular casing and preventing the sausage composition from flowing back in a direction opposite to the direction of travel of the tubular casing.

16. An apparatus as in claim 1 and including means for tying-off or clipping portions of said tubular casing and means for cutting off filled portions of said tubular casing.

* * * * *